(No Model.)
J. BEECHER.
Manufacture of Cutlery.
No. 241,471. Patented May 17, 1881.
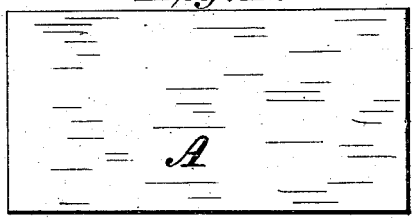
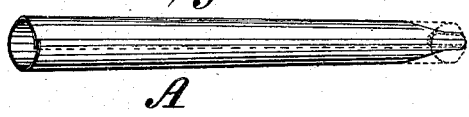
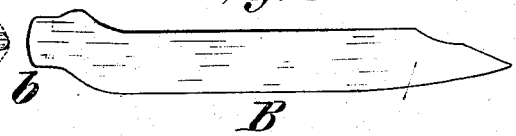
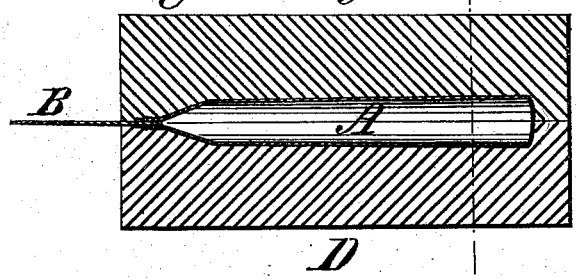
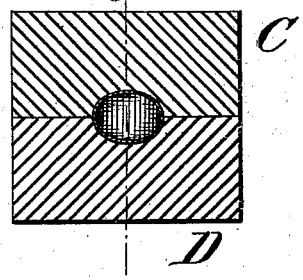
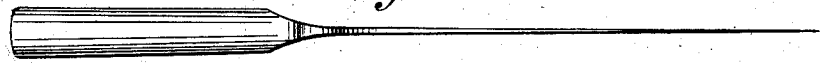
Witnesses: Thos. H. McCollin, Jos. P. Chipman
Inventor: James Beecher, by Collier & Bell, attys.
N. PETERS, Photo-Lithographer, Washington, D. C.

UNITED STATES PATENT OFFICE.

JAMES BEECHER, OF PHILADELPHIA, PENNSYLVANIA, ASSIGNOR OF ONE-HALF TO MICHAEL C. HIRSCH, OF SAME PLACE.

MANUFACTURE OF CUTLERY.

SPECIFICATION forming part of Letters Patent No. 241,471, dated May 17, 1881.

Application filed October 22, 1880. (No model.)

*To all whom it may concern:*

Be it known that I, JAMES BEECHER, of the city and county of Philadelphia, in the State of Pennsylvania, have invented certain new and useful Improvements in the Manufacture of Cutlery and Tools, of which improvements the following is a specification.

The object of my invention is to provide improved means for the production of articles of cutlery, tools, and the like, which, while embodying, notably, the qualities of lightness, strength, durability, and neatness of appearance, can be manufactured with greatly increased economy and dispatch as compared with those heretofore known in the trade.

To this end my improvements consist in a novel method of manufacturing the handles and securing together the handles and blades or tangs of cutlery and tools, and in a manufactured article of cutlery or tool having its handle made and secured to its blade or tang according to my said method. The improvements claimed are hereinafter set forth.

To enable those skilled in the art to practice my invention, I shall proceed to describe the manufacture of a carving-knife thereby, referring to the accompanying drawings, in which—

Figure 1 is a plan of the handle-blank; Fig. 2, a view, in perspective, of the same when formed into a hollow open-ended handle; Fig. 3, a view, in elevation, of the blade; Figs. 4 and 5, longitudinal and transverse sections, respectively, through the dies, in which the handle and blade are welded together; and Figs. 6 and 7, views, in elevation, of the finished knife.

To carry out my invention, I provide a rectangular blank, A, of sheet-iron, which I form over a mandrel and weld up into an open-ended tube corresponding substantially in cross-section with that desired for the handle, as shown in Fig. 2. The blank shown in Fig. 1 is of sufficient size to make one handle only; but in manufacturing upon a commercial scale I contemplate using blanks of proportionately greater length, so as to suffice for a number, and cutting them into proper lengths for the separate handles after the tube, Fig. 2, has been formed.

The steel blade B is of the ordinary construction, and is provided with a short longitudinal projection or tang, $b$, at its end nearest the handle, by which it is united thereto, as presently to be described.

The tubular handle A and blade B having been raised to a proper welding-heat in a furnace are then removed therefrom. The tang $b$ of the blade is inserted into one of the open ends of the handle, and the handle and blade are placed between a pair of forming-dies, C D, the conformation of which corresponds with that desired for the handle, and the concavity of which is of slightly less length than the partially-formed handle. The application of the impact of a drop-hammer to the dies and the contained blade and handle is then made, with the result of simultaneously welding together the handle and blade and closing up the open end of the handle farthest from the blade. The knife thus formed is removed from the dies, and, after being subjected to the finishing operations of grinding, polishing, and plating in the ordinary manner, is ready for use or sale. The use of a pair of finishing-dies will be found advantageous in the operation, although not essential to the practice of my invention.

It will be obvious that the form or design of the handle and blade may be varied indefinitely, the same being governed by the size of the blanks and the desired conformation given to the forming-dies C and D. In the instance illustrated the knife is not provided with the usual "bolster;" but bolsters of any required size or design can be produced simultaneously with the uniting of the blade and handle and the closing of the handle end by correspondingly shaping the dies at the point where the bolster is to be located. It will be further obvious that my improvements are equally applicable to the manufacture of table-cutlery, and to that of tools or implements of various descriptions in which the head or blade is of such character as to admit of its attachment to the handle in the manner hereinabove set forth.

I claim as my invention and desire to secure by Letters Patent—

1. The improvement in the art of manufacturing cutlery and tools which consists in simultaneously welding a tubular handle to a blade or head and closing up the opposite end of the handle by forging between dies, substantially as set forth.

2. As a new article of manufacture, a knife or other piece of cutlery or tool having a hollow handle united by welding to its blade or head, and having its ends closed simultaneously by forging between forming-dies, substantially as set forth.

JAMES BEECHER.

Witnesses:
J. DANIEL EBY,
ALEX. H. SIEGEL.